US011637826B2

(12) United States Patent
Rule et al.

(10) Patent No.: US 11,637,826 B2
(45) Date of Patent: Apr. 25, 2023

(54) ESTABLISHING AUTHENTICATION PERSISTENCE

(71) Applicant: Capital One Services, LLC, McLean, VA (US)

(72) Inventors: Jeffrey Rule, Chevy Chase, MD (US); Paul Moreton, Glen Allen, VA (US); Thomas Poole, Chantilly, VA (US)

(73) Assignee: Capital One Services, LLC, McLean, VA (US)

( * ) Notice: Subject to any disclaimer, the term of this patent is extended or adjusted under 35 U.S.C. 154(b) by 281 days.

(21) Appl. No.: 17/183,888

(22) Filed: Feb. 24, 2021

(65) Prior Publication Data

US 2022/0272083 A1    Aug. 25, 2022

(51) Int. Cl.
*H04L 29/06* (2006.01)
*H04L 9/40* (2022.01)

(52) U.S. Cl.
CPC ...... *H04L 63/0861* (2013.01); *H04L 63/0876* (2013.01); *H04L 63/20* (2013.01); *H04L 2463/082* (2013.01)

(58) Field of Classification Search
None
See application file for complete search history.

(56) References Cited

U.S. PATENT DOCUMENTS

| 4,683,553 A | 7/1987 | Mollier |
| 4,827,113 A | 5/1989 | Rikuna |
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |

(Continued)

FOREIGN PATENT DOCUMENTS

| CA | 3010336 A1 | 7/2017 |
| CN | 101192295 A | 6/2008 |

(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

(Continued)

*Primary Examiner* — Piotr Poltorak
(74) *Attorney, Agent, or Firm* — KDW Firm PLLC

(57) ABSTRACT

Various embodiments are generally directed to performing an authentication persistence check and, based on the check, allowing a previously successful authentication to persist on a user apparatus. The check may involve a stability check on the user apparatus. If the user apparatus is stable, device fingerprinting on the apparatus may be performed, the result of which may be compared to a snapshot of apparatus taken at the time of successful authentication. If the comparison reveals changes or drifts that are within a predetermined threshold, then the persistence of the authentication is allowed.

20 Claims, 12 Drawing Sheets

(56) References Cited

U.S. PATENT DOCUMENTS

| | | |
|---|---|---|
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |

(56) References Cited

U.S. PATENT DOCUMENTS

| | | |
|---|---|---|
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,819,803 B1 * | 8/2014 | Richards ............ H04L 63/1483 709/224 |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,237,146 B1 * | 1/2016 | Casillas ................ H04L 63/083 |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 * | 5/2016 | Bjontegard ........... A63F 13/216 |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 * | 9/2017 | Robinson ............. H04W 12/08 |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 * | 4/2018 | Candelore ............ G06Q 20/18 |
| 9,961,194 B1 | 5/2018 | Wiechman et al. |
| 9,965,756 B2 | 5/2018 | Davis et al. |
| 9,965,911 B2 * | 5/2018 | Wishne ................ G06Q 20/357 |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 11,184,766 B1 * | 11/2021 | Lord ...................... G06V 10/75 |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |

(56) References Cited

U.S. PATENT DOCUMENTS

| | | |
|---|---|---|
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0260080 A1* | 10/2009 | Yami .................... G06F 21/554 726/22 |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0229377 A1* | 8/2014 | Vakklaganti .......... G06Q 20/00 705/44 |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |

(56) References Cited

U.S. PATENT DOCUMENTS

| | | |
|---|---|---|
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0242605 A1* | 8/2015 | Du ............... G06F 21/31 726/7 |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0346851 A1* | 11/2017 | Drake ............... H04L 9/0838 |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |
| 2021/0014256 A1* | 1/2021 | Malhotra ............. H04L 63/1425 |
| 2021/0019756 A1* | 1/2021 | Rule ..................... G06F 21/35 |
| 2021/0342840 A1* | 11/2021 | Rule .................... G06Q 20/352 |
| 2021/0367944 A1* | 11/2021 | Gupta .................. H04L 67/56 |
| 2022/0255929 A1* | 8/2022 | Rafferty ............. H04L 63/0876 |

FOREIGN PATENT DOCUMENTS

| | | | |
|---|---|---|---|
| CN | 103023643 A | 4/2013 | |
| CN | 103417202 A | 12/2013 | |
| EP | 1085424 A1 * | 3/2001 | ........... G06F 21/316 |
| EP | 1085424 A1 | 3/2001 | |
| EP | 1223565 A1 | 7/2002 | |
| EP | 1265186 A2 | 12/2002 | |
| EP | 1783919 A1 | 5/2007 | |
| EP | 2139196 A1 | 12/2009 | |
| EP | 1469419 A1 | 8/2012 | |
| EP | 2852070 A1 | 3/2015 | |
| GB | 2457221 A | 8/2009 | |
| GB | 2516861 A | 2/2015 | |
| GB | 2551907 A | 1/2018 | |
| KR | 101508320 B1 | 4/2015 | |
| WO | 0049586 A1 | 8/2000 | |
| WO | 2006070189 A2 | 7/2006 | |
| WO | 2008055170 A2 | 5/2008 | |
| WO | 2009025605 A2 | 2/2009 | |
| WO | 2010049252 A1 | 5/2010 | |
| WO | 2011112158 A1 | 9/2011 | |
| WO | 2012001624 A1 | 1/2012 | |
| WO | 2013039395 A1 | 3/2013 | |
| WO | 2013155562 A1 | 10/2013 | |
| WO | 2013192358 A2 | 12/2013 | |
| WO | 2014043278 A1 | 3/2014 | |
| WO | 2014170741 A2 | 10/2014 | |
| WO | 2015179649 A1 | 11/2015 | |
| WO | WO-2015179649 A1 * | 11/2015 | ............. G06Q 20/10 |
| WO | 2015183818 A1 | 12/2015 | |
| WO | 2016097718 A1 | 6/2016 | |
| WO | 2016160816 A1 | 10/2016 | |
| WO | 2016168394 A1 | 10/2016 | |
| WO | WO-2016168394 A1 * | 10/2016 | ............. G06K 19/02 |
| WO | 2017042375 A1 | 3/2017 | |
| WO | 2017042400 A1 | 3/2017 | |
| WO | 2017157859 A1 | 9/2017 | |
| WO | 2017208063 A1 | 12/2017 | |
| WO | 2018063809 A1 | 4/2018 | |
| WO | WO-2018063809 A1 * | 4/2018 | ................ B41J 2/00 |
| WO | 2018137888 A1 | 8/2018 | |

OTHER PUBLICATIONS

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019], Retrieved from Internet URL: https://usa.visa.com/dam/VCOM/download/merchants/visa-account-updater-product-infomnation-fact-sheet-for-merchants.pdf, 2 pages.

(56) References Cited

OTHER PUBLICATIONS

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104,12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2019]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.

Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone", Conference paper (2013) IEEE AFRICON At Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author Unknown: "onetappayment™", [online] Jan. 24, 2019, [retrieved on Mar. 25, 2019]. Retrieved from Internet URL: https://www.payubiz.in/onetap, 4 pages.

Vu, et al., "Distinguishing users with capacitive touch communication", Proceedings of the Annual International Conference on Mobile Computing and Networking, 2012, MOBICOM. 10.1145/2348543.2348569.

Pourghomi, P., et al., "A Proposed NFC Payment Application, International Journal of Advanced Computer Science and Applications," 4(8):173-181 (2013).

Author unknown, "EMV Card Personalization Specification", EMVCo., LLC., specification version 1.0, (2003) 81 pages.

Ullmann et al., "On-Card User Authentication for Contactless Smart Cards based on Gesture Recognition", paper presentation LNI proceedings, (2012) 12 pages.

Faraj, S.T., et al., "Investigation of Java Smart Card Technology for Multi-Task Applications", J of Al-Anbar University for Pure Science, 2(1):23 pages (2008).

Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.

* cited by examiner

Device Settings 602

- Eight Apps Installed
- Three of the Eight Apps are Social Media Apps; Three are Entertainment Apps; One is a Food App; One is a Map App
- Two Wireless Devices Connected
- Five Wireless Devices Saved to the Wireless Devices List
- Not Connected to WiFi
- Four Saved WiFi Networks
- Version of Operating System is 2.0.
- Display Setting: Hibernation Mode Kicks in after 3 mins.
- Notification Setting: Vibration

User Behavioral Biometrics 604

- Rarely Holds the User Apparatus Horizontally
- Always Swipes from Left to Right
- No Gestural Shortcuts
- Types Approximately 55 Words per Minute on User Apparatus
- Presses Home Button to Transition between Apps and Rarely uses the App Tabs to Transition
- A Majority of the Time Selects App 606 First and then App 608

Device Settings 802

- Ten Apps Installed
- Three of the Ten Apps are Social Media Apps; Three are Entertainment Apps; One is a Food App; One is a Map App; One is a TV App; One is a Photo App
- One Wireless Devices Connected
- Six Wireless Devices Saved to the Wireless Devices List
- Not Connected to WiFi
- Five Saved WiFi Networks
- Version of Operating System is 2.0.
- Display Setting: Hibernation Mode Kicks in after 3 mins.
- Notification Setting: Silent

User Behavioral Biometrics 804

- Rarely Holds the User Apparatus Horizontally
- Always Swipes from Left to Right
- No Gestural Shortcuts
- Types Approximately 50 Words per Minute on User Apparatus
- Presses Home Button to Transition between Apps and Rarely uses the App Tabs to Transition
- A Majority of the Time Selects App 606 First and then App 608
- A Majority of the Time Selects App 806 First then App 808

| Device Settings 602 | User Behavioral Biometrics 604 |
|---|---|
| • Eight Apps Installed<br>• Three of the Eight Apps are Social Media Apps; Three are Entertainment Apps; One is a Food App; One is a Map App<br>• Two Wireless Devices Connected<br>• Five Wireless Devices Saved to the Wireless Devices List<br>• Not Connected to WiFi<br>• Four Saved WiFi Networks<br>• Version of Operating System is 2.0.<br>• Display Setting: Hibernation Mode Kicks in after 3 mins.<br>• Notification Setting: Vibration | • Rarely Holds the User Apparatus Horizontally<br>• Always Swipes from Left to Right<br>• No Gestural Shortcuts<br>• Types Approximately 55 Words per Minute on User Apparatus<br>• Presses Home Button to Transition between Apps and Rarely uses the App Tabs to Transition<br>• A Majority of the Time Selects App 606 First and then App 608 |

| Device Settings 802 | User Behavioral Biometrics 804 |
|---|---|
| • Ten Apps Installed<br>• Three of the Ten Apps are Social Media Apps; Three are Entertainment Apps; One is a Food App; One is a Map App; One is a TV App; One is a Photo App<br>• One Wireless Devices Connected<br>• Six Wireless Devices Saved to the Wireless Devices List<br>• Not Connected to WiFi<br>• Five Saved WiFi Networks<br>• Version of Operating System is 2.0.<br>• Display Setting: Hibernation Mode Kicks in after 3 mins.<br>• Notification Setting: Silent | • Rarely Holds the User Apparatus Horizontally<br>• Always Swipes from Left to Right<br>• No Gestural Shortcuts<br>• Types Approximately 50 Words per Minute on User Apparatus<br>• Presses Home Button to Transition between Apps and Rarely uses the App Tabs to Transition<br>• A Majority of the Time Selects App 606 First and then App 608<br>• A Majority of the Time Selects App 806 First then App 808 |

FIG. 9

ESTABLISHING AUTHENTICATION PERSISTENCE

BACKGROUND

Authentication may be the act of proving or verifying an assertion, such as an identity of a user of a computing device. The ways in which the user is authenticated may fall into three categories based on what are known as the factors of authentication: something that the user knows, something the user has, and something the user is. Each authentication factor may cover a range of elements used to authenticate or verify the user's identity prior to being granted access, approving a request, signing a document or other work product, granting authority to others, establishing chain of authority, etc.

SUMMARY

Various embodiments are generally directed to performing an authentication persistence check and, based on the check, allowing a previously successful authentication to persist on a user apparatus. The check may involve a stability check on the user apparatus. If the user apparatus is stable, device fingerprinting on the apparatus may be performed, the result of which may be compared to a snapshot of apparatus taken at the time of successful authentication. If the comparison reveals changes or drifts that are within a predetermined threshold, then the persistence of the authentication may be allowed.

BRIEF DESCRIPTION OF THE DRAWINGS

FIG. 6 illustrates an example snapshot of the device settings and user behavioral biometrics in accordance with one or more embodiments.

FIG. 8 illustrates an example device fingerprinting in accordance with one or more embodiments.

FIG. 9 illustrates an example drift analysis in accordance with one or more embodiments.

DETAILED DESCRIPTION

Figure 1A:
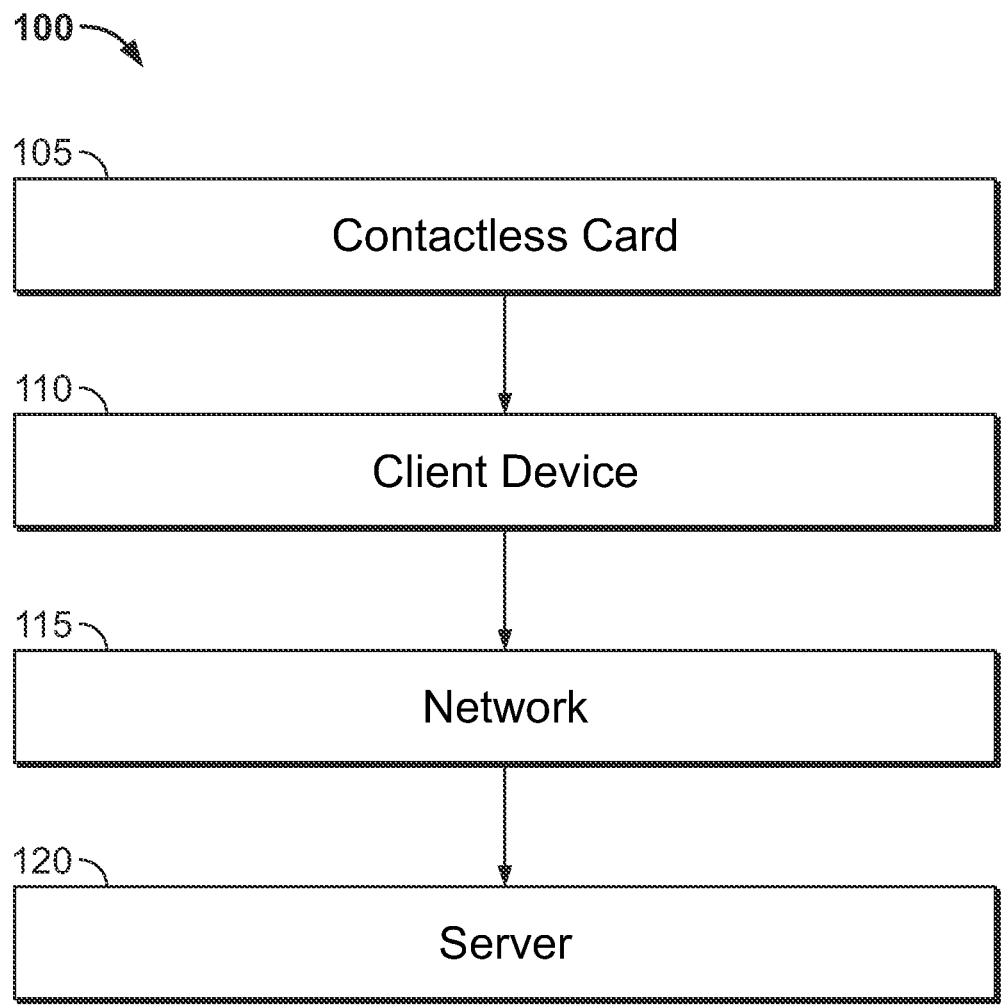
FIG. 1A illustrates an example data transmission system in accordance with one or more embodiments.

Various embodiments are generally directed to performing an authentication persistence check on a user apparatus (e.g., mobile computing device), and based on a positive persistence check, allowing a previously successful authentication (e.g., first factor authentication, second factor authentication) to persist for a predetermined period of time. For example, the authentication persistence check may be triggered or caused by one or more factors, such as a passing of a specific amount of time after a first instance of the authentication or when an authentication event occurs, which may include any action or instance that would typically require an authentication to be performed or processed, e.g., high-risk action or behavior, risk level of user action.

According to embodiments, the authentication persistence check may be considered positive if: (i) the user apparatus is stable based on a stability check and (ii) device settings of the user apparatus and/or behavioral biometrics associated with the user are within a predetermined drift threshold. Based on a positive persistence check, the previously successful authentication may persist for the predetermined period of time, and thus, does not require the user to reauthenticate. If, however, the persistence check is negative, the user would be required to reauthenticate.

After the predetermined period of time has passed since the positive authentication persistence check or when a subsequent authentication event occurs, a subsequent persistence check may be performed to determine if the authentication can continue to persist. In some instances, the number of consecutive positive persistence checks may be limited, and thus, the user may be required to reauthenticate after that limit has been reached.

According to embodiments, the types of authentication that can persist may include first factor authentication and second factor authentication, where the first factor and second factor authentications may be different from each other. For instance, the first factor authentication process may require the authenticating user to know something, such as a login ID and password. The second factor authentication may require the authenticating user to possess and utilize something, such as a contactless smart card.

In examples, the second factor authentication may involve the user tapping a contactless card to the user apparatus such that near field communication (NFC) is established between the apparatus and the contactless card. The user apparatus may receive encrypted authentication information from the contactless card via an NFC reader, send the authentication information to one or more remote authentication servers, and receive from the authentication servers an indication that the user is verified and authenticated.

At time of successful authentication, one or more device settings of the user apparatus and/or one or more user behavioral biometrics associated with the use of or interaction with the user apparatus may be determined. This may be referred to or described herein as taking a "snapshot" of a "constellation" of the various device settings and user behavioral biometrics. As will be further described below, the snapshot may be used as a reference point for determining how much the device settings and/or user behavioral biometrics have drifted, deviated, or changed at the time of the authentication persistence check. The allotted degree of drift, deviation, or change may be referred to herein as the predetermined drift threshold.

When the authentication persistence check is triggered, a stability check may be performed on the user apparatus. For example, the stability check may be a mobile network operator (MNO) verification, which may involve verifying or checking with the appropriate MNO(s) that the user apparatus has not substantially changed (e.g., has not changed SIM cards, has not changed phone numbers, has not changed owners, etc.) so as to at least confirm that the user apparatus still belongs to and is associated with the user.

In response to the user apparatus having passed the stability check or otherwise being stable, a device fingerprinting of the user apparatus may be performed. Device fingerprinting may be process in which a current constellation of the device settings and/or user behavioral biometrics corresponding to the user apparatus is determined. In at least that regard, device fingerprinting may be similar to the process of taking the snapshot at the time of successful authentication, as described above.

According to further embodiments, it may be determined whether the current constellation of the device settings and/or user behavioral biometrics provided by the device fingerprinting is within the predetermined drift threshold. If within the drift threshold, the authentication may be allowed to persist. If outside the drift threshold, the user may be required to reauthenticate, and in some examples, reauthenticate via both the first and second factor authentications.

In previous solutions, each instance of authentication required the user to manually perform authentication-related acts to complete the authentication process, which would cause user annoyance and friction between the user and platform. The embodiments and examples described herein are advantageous over conventional solutions in various ways. For example, authentication may be allowed to automatically persist based on a positive authentication persistence check in a highly secure manner, which makes the authentication process convenient for the user and improves overall quality of user experience.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1A illustrates an example data transmission system according to one or more embodiments. As further discussed below, system 100 may include contactless card 105, client device 110, network 115, and server 120. Although FIG. 1A illustrates single instances of the components, system 100 may include any number of components.

System 100 may include one or more contactless cards 105, which are further explained below with reference to FIG. 3A and FIG. 3B. In some embodiments, contactless card 105 may be in wireless communication, utilizing NFC in an example, with client device 110.

System 100 may include client device 110, which may be a network-enabled computer. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. Client device 110 also may be a mobile computing device, for example, an iPhone, iPod, iPad from Apple® or any other suitable device running Apple's iOS® operating system, any device running Microsoft's Windows® Mobile operating system, any device running Google's Android® operating system, and/or any other suitable mobile computing device, such as a smartphone, a tablet, or like wearable mobile device.

The client device 110 device can include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

In some examples, client device 110 of system 100 may execute one or more applications, such as software applications, that enable, for example, network communications with one or more components of system 100 and transmit and/or receive data.

Client device 110 may be in communication with one or more servers 120 via one or more networks 115 and may operate as a respective front-end to back-end pair with server 120. Client device 110 may transmit, for example, from a mobile device application executing on client device 110, one or more requests to server 120. The one or more requests may be associated with retrieving data from server 120. Server 120 may receive the one or more requests from client device 110. Based on the one or more requests from client device 110, server 120 may be configured to retrieve the requested data from one or more databases (not shown). Based on receipt of the requested data from the one or more databases, server 120 may be configured to transmit the received data to client device 110, the received data being responsive to one or more requests.

System 100 may include one or more networks 115. In some examples, network 115 may be one or more of a wireless network, a wired network or any combination of wireless network and wired network and may be configured to connect client device 110 to server 120. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 802.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may include a plurality of interconnected networks, such as, for example, the Internet, a service provider's network, a cable television network, corporate networks, such as credit card association networks, and home networks.

System 100 may include one or more servers 120. In some examples, server 120 may include one or more processors, which are coupled to memory. Server 120 may be configured as a central system, server or platform to control and call various data at different times to execute a plurality of workflow actions. Server 120 may be configured to connect to the one or more databases. Server 120 may be connected to at least one client device 110.

Figure 1B:
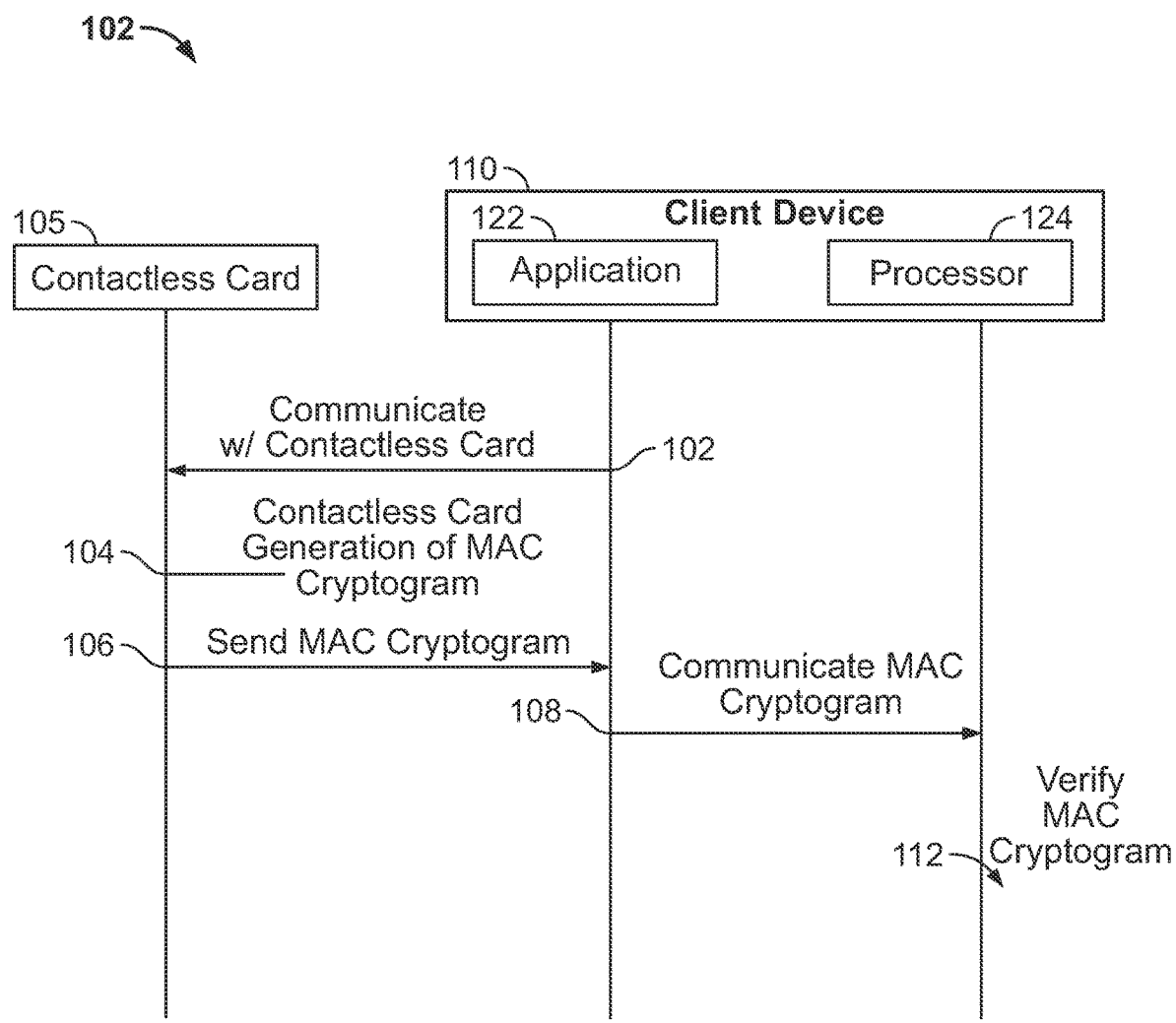
FIG. 1B illustrates an example sequence diagram for providing authenticated access in accordance with one or more embodiments.

FIG. 1B illustrates an example sequence diagram for providing authenticated access according to one or more embodiments. The diagram may include contactless card 105 and client device 110, which may include an application 122 and processor 124. FIG. 1B may reference similar components as illustrated in FIG. 1A.

At step 102, the application 122 communicates with the contactless card 105 (e.g., after being brought near the contactless card 105). Communication between the application 122 and the contactless card 105 may involve the contactless card 105 being sufficiently close to a card reader (not shown) of the client device 110 to enable NFC data transfer between the application 122 and the contactless card 105.

At step 104, after communication has been established between client device 110 and contactless card 105, the contactless card 105 generates a message authentication code (MAC) cryptogram. In some examples, this may occur when the contactless card 105 is read by the application 122. In particular, this may occur upon a read, such as an NFC read, of a near field data exchange (NDEF) tag, which may be created in accordance with the NFC Data Exchange Format.

For example, a reader, such as application 122, may transmit a message, such as an applet select message, with the applet ID of an NDEF producing applet. Upon confirmation of the selection, a sequence of select file messages followed by read file messages may be transmitted. For example, the sequence may include "Select Capabilities file," "Read Capabilities file," and "Select NDEF file." At this point, a counter value maintained by the contactless card 105 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string).

In some examples, application 122 may be configured to transmit a request to contactless card 105, the request comprising an instruction to generate a MAC cryptogram.

At step 106, the contactless card 105 sends the MAC cryptogram to the application 122. In some examples, the transmission of the MAC cryptogram occurs via NFC, however, the present disclosure is not limited thereto. In other examples, this communication may occur via Bluetooth, Wi-Fi, or other means of wireless data communication.

At step 108, the application 122 communicates the MAC cryptogram to the processor 124. At step 112, the processor 124 verifies the MAC cryptogram pursuant to an instruction from the application 122. For example, the MAC cryptogram may be verified, as explained below.

In some examples, verifying the MAC cryptogram may be performed by a device other than client device 110, such as a server 120 in data communication with the client device 110 (as shown in FIG. 1A). For example, processor 124 may output the MAC cryptogram for transmission to server 120, which may verify the MAC cryptogram.

In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

It may be understood that in some examples, the contactless card 105 may initiate communication after the contactless card is brought near the client device 110. By way of example, the contactless card 105 may send the client device 110 a message, for instance, indicating that the contactless card has established communication. Thereafter, the application 122 of client device 110 may proceed to communicate with the contactless card at step 102, as described above.

Figure 2:
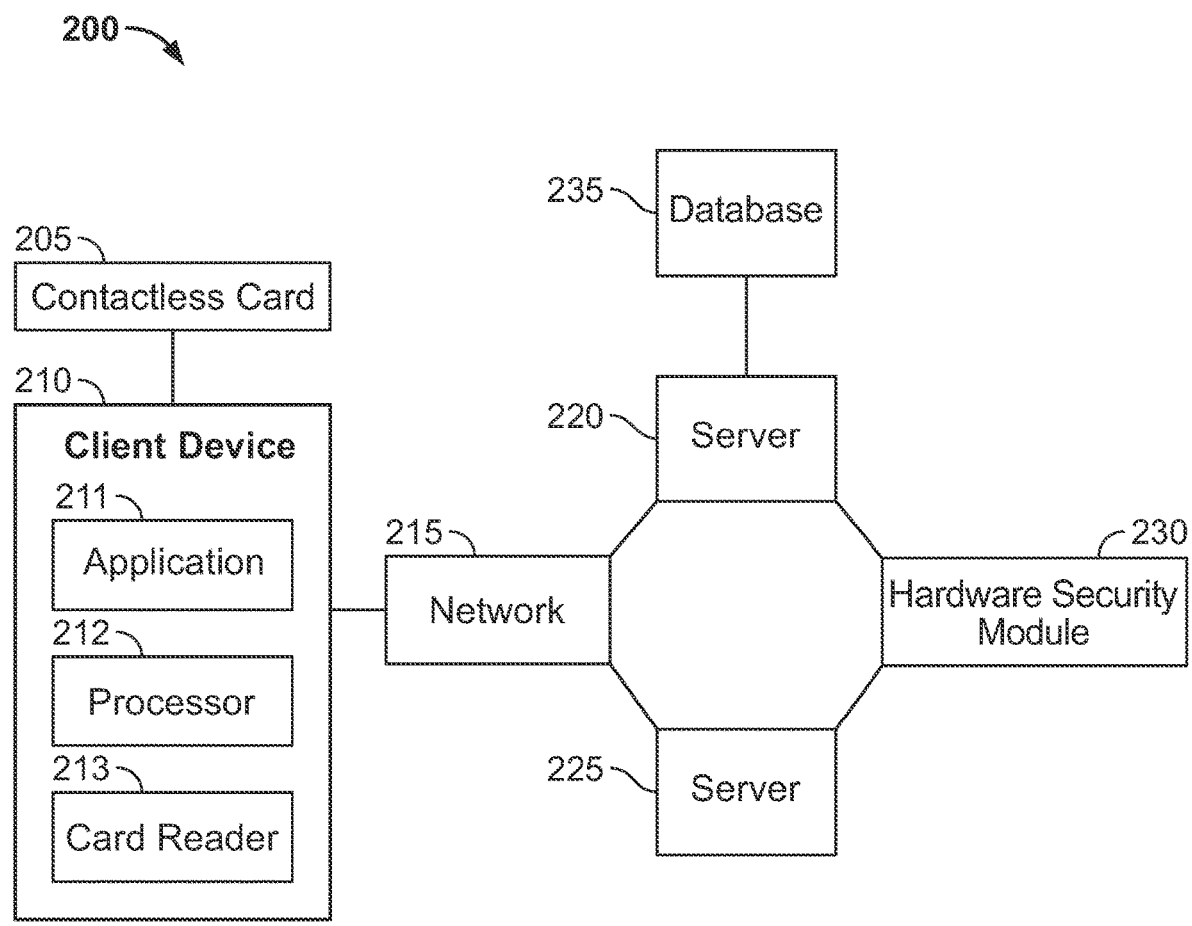
FIG. 2 illustrates an example system using a contactless card in accordance with one or more embodiments.

FIG. 2 illustrates an example system 200 using a contactless card. System 200 may include a contactless card 205, one or more client devices 210, network 215, servers 220, 225, one or more hardware security modules 230, and a database 235. Although FIG. 2 illustrates single instances of the components, system 200 may include any number of components.

System 200 may include one or more contactless cards 205, which are further explained below with respect to FIG. 3A and FIG. 3B. In some examples, contactless card 205 may be in wireless communication, for example NFC, with client device 210. For example, contactless card 205 may include one or more chips, such as a radio frequency identification chip, configured to communication via NFC or other short-range protocols. In other embodiments, contactless card 205 may communicate with client device 210 through other means including, but not limited to, Bluetooth, satellite, Wi-Fi, wired communications, and/or any combination of wireless and wired connections. According to some embodiments, contactless card 205 may be configured to communicate with card reader 213 (which may otherwise be referred to herein as NFC reader, NFC card reader, or reader) of client device 210 through NFC when contactless card 205 is within range of card reader 213. In other examples, communications with contactless card 205 may be accomplished through a physical interface, e.g., a universal serial bus interface or a card swipe interface.

System 200 may include client device 210, which may be a network-enabled computer. As referred to herein, a network-enabled computer may include, but is not limited to: e.g., a computer device, or communications device including, e.g., a server, a network appliance, a personal computer, a workstation, a mobile device, a phone, a handheld PC, a personal digital assistant, a thin client, a fat client, an Internet browser, or other device. One or more client devices 210 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone or like wearable mobile device. In some examples, the client device 210 may be the same as, or similar to, a client device 110 as described with reference to FIG. 1A or FIG. 1B.

Client device 210 may be in communication with one or more servers 220 and 225 via one or more networks 215. Client device 210 may transmit, for example from an application 211 executing on client device 210, one or more requests to one or more servers 220 and 225. The one or more requests may be associated with retrieving data from one or more servers 220 and 225. Servers 220 and 225 may receive the one or more requests from client device 210. Based on the one or more requests from client device 210, one or more servers 220 and 225 may be configured to retrieve the requested data from one or more databases 235. Based on receipt of the requested data from the one or more databases 235, one or more servers 220 and 225 may be configured to transmit the received data to client device 210, the received data being responsive to one or more requests.

System 200 may include one or more hardware security modules (HSM) 230. For example, one or more HSMs 230 may be configured to perform one or more cryptographic operations as disclosed herein. In some examples, one or more HSMs 230 may be configured as special purpose security devices that are configured to perform the one or more cryptographic operations. The HSMs 230 may be configured such that keys are never revealed outside the HSM 230, and instead are maintained within the HSM 230. For example, one or more HSMs 230 may be configured to perform at least one of key derivations, decryption, and MAC operations. The one or more HSMs 230 may be contained within, or may be in data communication with, servers 220 and 225.

System 200 may include one or more networks 215. In some examples, network 215 may be one or more of a wireless network, a wired network or any combination of wireless network and wired network, and may be configured to connect client device 210 to servers 220 and/or 225. For example, network 215 may include one or more of a fiber optics network, a passive optical network, a cable network, a cellular network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, RFID, Wi-Fi, and/or any combination of networks thereof. As a non-limiting example, communications from contactless card 205 and client device 210 may include NFC-based communication, cellular network between client device 210 and a carrier, and Internet between the carrier and a backend.

In addition, network 215 may include, without limitation, telephone lines, fiber optics, IEEE Ethernet 802.3, a wide area network, a wireless personal area network, a local area network, or a global network such as the Internet. In addition, network 215 may support an Internet network, a wireless communication network, a cellular network, or the like, or any combination thereof. Network 215 may further include one network, or any number of the exemplary types of networks mentioned above, operating as a stand-alone network or in cooperation with each other. Network 215 may utilize one or more protocols of one or more network elements to which they are communicatively coupled. Network 215 may translate to or from other protocols to one or more protocols of network devices. Although network 215 is depicted as a single network, it should be appreciated that according to one or more examples, network 215 may include a plurality of interconnected networks, such as, for example, the Internet, a service provider's network, a cable television network, corporate networks, such as credit card association networks, and home networks.

In various examples according to the present disclosure, client device 210 of system 200 may execute one or more applications 211, and include one or more processors 212, and one or more card readers 213. For example, one or more applications 211, such as software applications, may be configured to enable, for example, network communications with one or more components of system 200 and transmit and/or receive data. It is understood that although only single instances of the components of client device 210 are illustrated in FIG. 2, any number of devices 210 may be used. Card reader 213 may be configured to read from and/or communicate with contactless card 205. In conjunction with the one or more applications 211, card reader 213 may communicate with contactless card 205. In examples, the card reader 213 may include circuitry or circuitry components, e.g., NFC reader coil, that generates a magnetic field to allow communication between the client device 210 and the contactless card 205.

The application 211 of any of client device 210 may communicate with the contactless card 205 using short-range wireless communication (e.g., NFC). The application 211 may be configured to interface with a card reader 213 of client device 210 configured to communicate with a contactless card 205. As should be noted, those skilled in the art would understand that a distance of less than twenty centimeters is consistent with NFC range.

In some embodiments, the application 211 communicates through an associated reader (e.g., card reader 213) with the contactless card 205.

In some embodiments, card activation may occur without user authentication. For example, a contactless card 205 may communicate with the application 211 through the card reader 213 of the client device 210 through NFC. The communication (e.g., a tap of the card proximate the card reader 213 of the client device 210) allows the application 211 to read the data associated with the card and perform an activation. In some cases, the tap may activate or launch application 211 and then initiate one or more actions or communications with an account server 225 to activate the card for subsequent use. In some cases, if the application 211 is not installed on client device 210, a tap of the card against the card reader 213 may initiate a download of the application 211 (e.g., navigation to an application download page). Subsequent to installation, a tap of the card may activate or launch the application 211, and then initiate (e.g., via the application or other back-end communication) activation of the card. After activation, the card may be used in various transactions including commercial transactions.

According to some embodiments, the contactless card 205 may include a virtual payment card. In those embodiments, the application 211 may retrieve information associated with the contactless card 205 by accessing a digital wallet implemented on the client device 210, wherein the digital wallet includes the virtual payment card. In some examples, virtual payment card data may include one or more static or dynamically generated virtual card numbers.

Server 220 may include a web server in communication with database 235. Server 225 may include an account server. In some examples, server 220 may be configured to validate one or more credentials from contactless card 205 and/or client device 210 by comparison with one or more credentials in database 235. Server 225 may be configured to authorize one or more requests, such as payment and transaction, from contactless card 205 and/or client device 210.

Figure 3A:
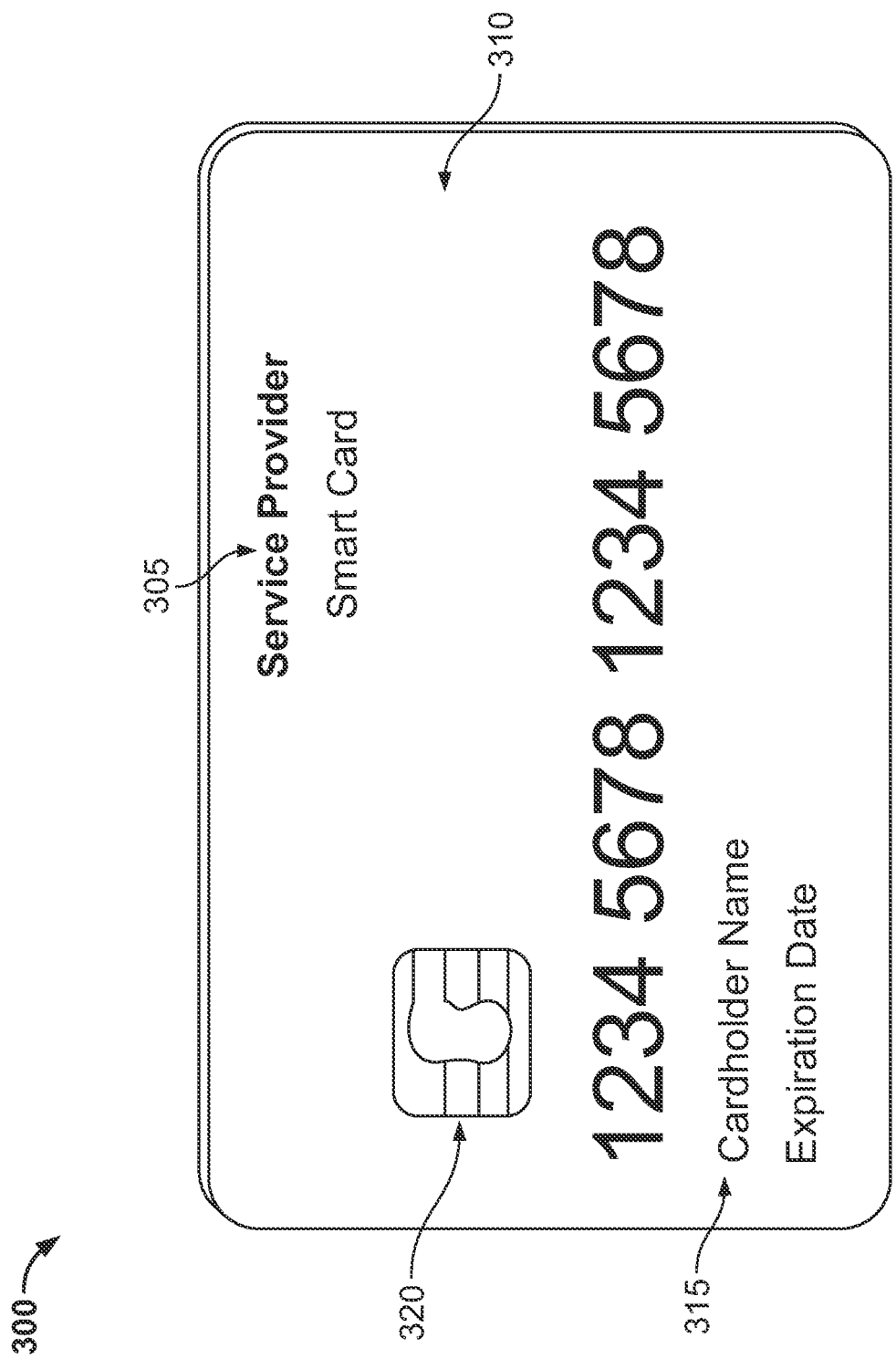
FIG. 3A illustrates an example contactless card in accordance with one or more embodiments.

FIG. 3A illustrates one or more contactless cards 300, which may include a payment card, such as a credit card, debit card, or gift card, issued by a service provider 305 displayed on the front or back of the card 300. In some examples, the contactless card 300 is not related to a payment card, and may include, without limitation, an identification card. In some examples, the payment card may include a dual interface contactless payment card. The contactless card 300 may include a substrate 310, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 300 may have physical characteristics compliant with the ID-1 format of the ISO/IEC 7810 standard, and the contactless card may otherwise be compliant with the ISO/IEC 14443 standard. However, it is understood that the contactless card 300 according to the present disclosure may have different characteristics, and the present disclosure does not require a contactless card to be implemented in a payment card.

The contactless card 300 may also include identification information 315 displayed on the front and/or back of the card, and a contact pad 320. The contact pad 320 may be configured to establish contact with another communication device, such as a user device, smart phone, laptop, desktop, or tablet computer. The contactless card 300 may also include processing circuitry, antenna and other components not shown in FIG. 3A. These components may be located behind the contact pad 320 or elsewhere on the substrate 310. The contactless card 300 may also include a magnetic strip or tape, which may be located on the back of the card (not shown in FIG. 3A).

Figure 3B:
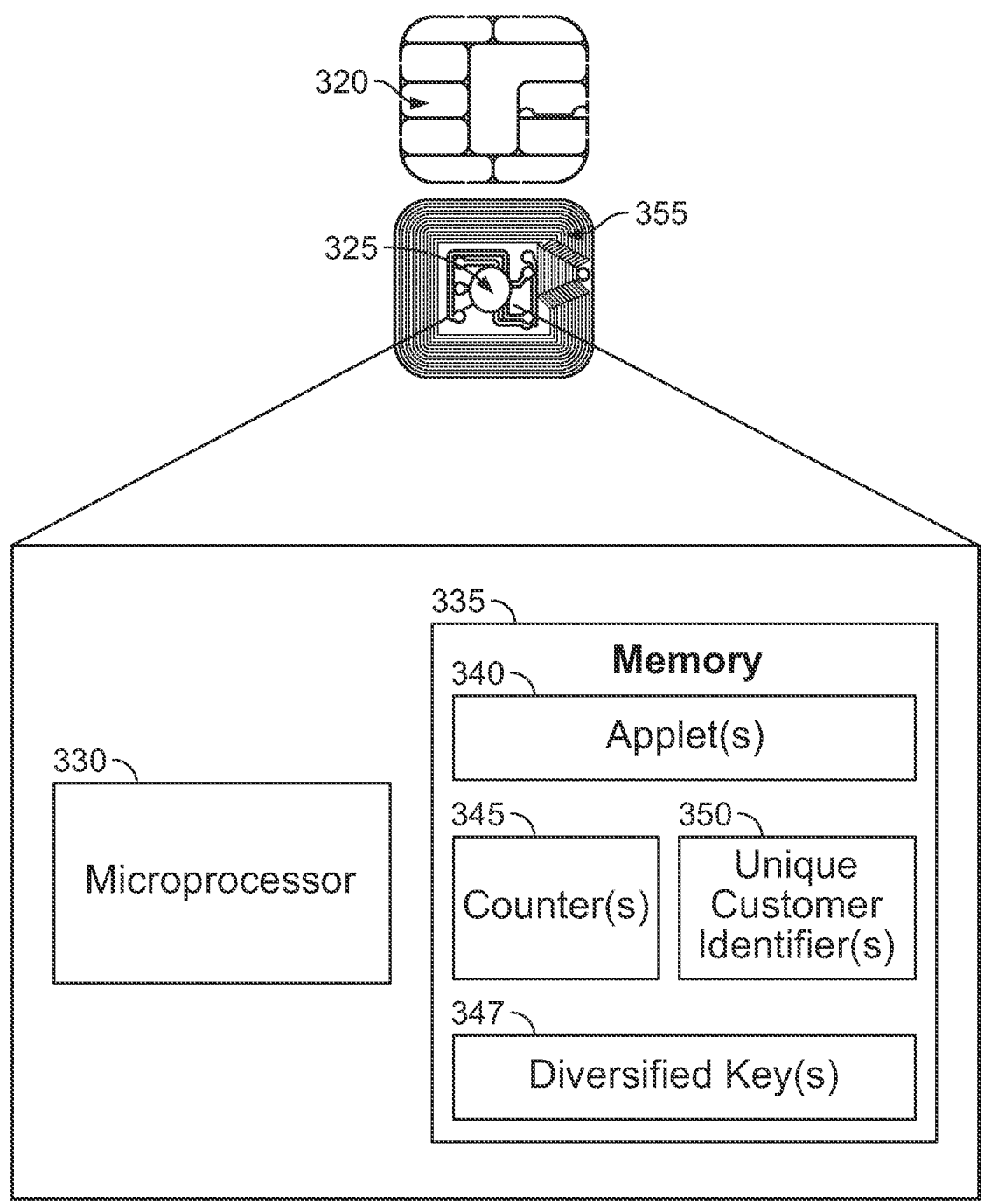
FIG. 3B illustrates an example contact pad of a contactless card in accordance with one or more embodiments.

As illustrated in FIG. 3B, the contact pad 320 of FIG. 3A may include processing circuitry 325 for storing and processing information, including a microprocessor 330 and a memory 335. It is understood that the processing circuitry 325 may contain additional components, including processors, memories, error and parity/CRC checkers, data encoders, anti-collision algorithms, controllers, command decoders, security primitives and tamper-proofing hardware, as necessary to perform the functions described herein.

The memory 335 may be a read-only memory, write-once read-multiple memory or read/write memory, e.g., RAM, ROM, and EEPROM, and the contactless card 300 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times.

The memory 335 may be configured to store one or more applets 340, one or more counters 345, one or more diversified keys 347, one or more customer identifiers 350, and other types of suitable data or information. The one or more applets 340 may include one or more software applications configured to execute on one or more contactless cards, such as Java Card applet. However, it is understood that applets 340 are not limited to Java Card applets, and instead may be any software application operable on contactless cards or other devices having limited memory. The one or more counters 345 may include a numeric counter sufficient to store an integer. As will be further described below, the one or more diversified keys 347 may be used to encrypt various information, such as information about the user or customer (e.g., customer identifier 450) to generate cryptogram(s) that can be sent to, for example, a mobile device for at least authentication purposes. The customer identifier 350 may include a unique alphanumeric identifier assigned to a user of the contactless card 300, and the identifier may distinguish the user of the contactless card from other contactless card users. In some examples, the customer identifier 350 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 320 or entirely separate from it, or as further elements in addition to microprocessor 330 and memory 335 elements located within the contact pad 320.

In some examples, the contactless card 300 may include one or more antennas 355. The one or more antennas 355 may be placed within the contactless card 300 and around the processing circuitry 325 of the contact pad 320. For example, the one or more antennas 355 may be integral with the processing circuitry 325 and the one or more antennas 355 may be used with an external booster coil. As another example, the one or more antennas 355 may be external to the contact pad 320 and the processing circuitry 325.

In an embodiment, the coil of contactless card 300 may act as the secondary of an air core transformer. The terminal may communicate with the contactless card 300 by cutting power or amplitude modulation. The contactless card 300 may infer the data transmitted from the terminal using the gaps in the contactless card's power connection, which may be functionally maintained through one or more capacitors. The contactless card 300 may communicate back by switching a load on the contactless card's coil or load modulation. Load modulation may be detected in the terminal's coil through interference.

As explained above, the contactless cards 300 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that includes a cryptographically secure OTP encoded as an NDEF text tag.

In examples, when preparing to send data (e.g., to a mobile device, to a server, etc.), the contactless card 300 may increment a counter value of a counter of the one or more counters 345. The contactless card 300 may then provide a master key, which may be a distinct key stored on the card 300, and the counter value as input to a cryptographic algorithm, which may also be stored on the card 300 and produces a diversified key as output, which may be one of the diversified keys 347. It is understood that the master key and the counter value is also securely stored in memory of a device or component receiving data from the contactless card 300 so as to decrypt the data using the diversified key that was used by the card to encrypt the transmitted data. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC. The contactless card 300 may then encrypt the data (e.g., the customer identifier 350 and any other data) using the diversified key in the form of one or more cryptograms that can be sent to a mobile device, for example, as NFC data exchange format (NDEF) messages. The contactless card 300 may then transmit the encrypted data (e.g., cryptograms) to the mobile device, which can then decrypt the cryptograms using the diversified key (e.g., the diversified key generated by the mobile device using the counter value and the master key stored in memory thereof).

Figure 4:
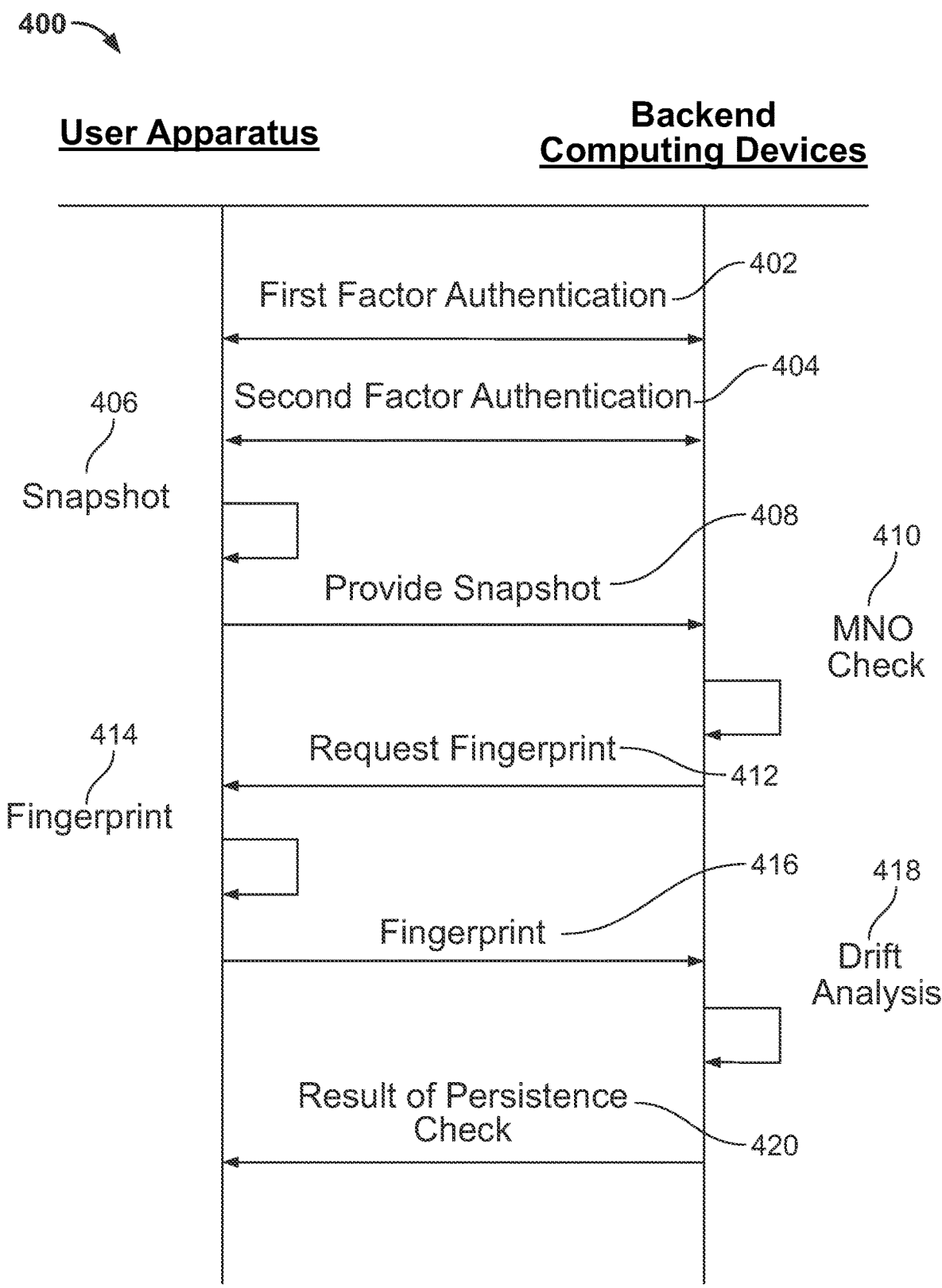
FIG. 4 illustrates an example timing diagram in accordance with one or more embodiments.

FIG. 4 illustrates an example timing diagram 400 according to one or more embodiments. The timing diagram 400 shows at least the various timing-related features associated with an authentication persistence check and the communication between a user apparatus (e.g., user mobile computing device such as a smartphone, laptop, etc.) and one or more remote backend computing devices (e.g., servers). In examples, the authentication persistence check may be for the second factor authentication, which may otherwise be referred to as a second factor authentication persistence check.

As shown, at time 402 a first factor authentication may be required and performed. As will be further described in detail below, the first factor authentication may involve user ID-password authentication. For example, a user may enter a user ID and password, which may be provided to the backend servers to verify that the entered user ID and password are correct.

At time 404, after successful first factor authentication, a second factor authentication may be required and performed. The second factor authentication may be different type of authentication than the first factor authentication. For example, the second factor authentication may involve the user tapping a contactless card to the user apparatus, which may otherwise be known as one-tap or single tap authentication. The user apparatus, via NFC, receives encrypted user authentication information from the contactless card, e.g., one or more cryptograms containing a user identifier, authentication identifier, etc. The user apparatus may send the cryptogram(s) to remote computing devices, which may be the backed servers, where those servers decrypt the cryptograms to verify whether the user identifier contained therein corresponds to or matches the user. The remote computing devices may then send back an indication to the user apparatus that the user has been successfully authenticated.

At the time of successful second factor authentication (time 406) or near that time, a snapshot of the one or more device settings (e.g., number of apps installed on the phone, types of apps, of the user apparatus and information on one or more user behavioral biometrics (e.g., unique behaviors or patterns related to the use of or interactions with the user apparatus by the user) may be captured. The captured result may be considered a constellation of the device settings and the user behavioral biometrics. The snapshot may be sent or shared with the one or more backend servers for later comparisons to device fingerprints during future persistence checks. While FIG. 4 shows snapshot occurring after the second factor authentication of time 404, it may be understood that the snapshot may occur at the same time or near the same time as second factor authentication. The snapshot may be provided to the one or more remote backend computing devices at time 408.

Thereafter, the second factor authentication persistence check may be performed. The check may be triggered by one of at least: a passage of a specific amount of time or a specific second factor authentication event. The specific amount of time may be predetermined or preset, e.g., a maximum of time that can pass before the user is required to perform the second factor authentication again. The second factor authentication event may be any action or event, either caused or triggered by the user, that requires the second factor authentication, such as high-risk transactions.

At time 410, a stability check or verification on the user apparatus may be performed. The user apparatus may request and cause the one or more backend remote computing devices to conduct the stability check by communicating with one or more mobile operator servers associated with a mobile operator network (MNO), e.g., via application programming interface (API) calls. In other instances, the one or more remote backend servers automatically initiate or may be automatically caused to perform the stability check in response to the second factor authentication persistence check, an indication of which may be provided to the remote backend servers by the user apparatus. One example of the stability check is an MNO stability check, which involves the backend computing devices to request and receive indication from the mobile operator servers that the user apparatus has not substantially changed, e.g., the SIM card of the user apparatus remains the same, the telephone number associated with the user apparatus remains the same, etc.

At time 412, in response to a determination that the user apparatus is stable, the one or more backed computing devices may request that the user apparatus perform device fingerprinting. Alternatively, at time 412, in response to a determination that the user apparatus is unstable, the one or more backend servers may return a negative result for the persistence check and require that the user to reauthenticate via the second factor authentication (not shown).

At time 414, the user apparatus may perform device fingerprinting. As will be further described below, device fingerprinting may be a process in which a current constellation of the device settings of the user apparatus and the one or more user behavioral biometrics associated with the use or interaction with the user apparatus is determined. The current constellation may be provided to the one or more backend computing devices at time 416.

At time 418, the backend computing devices may perform a drift analysis. For example, the drift analysis may involve at least determining whether the current constellation of the user apparatus that was provided at time 416 is within a predetermined drift threshold relative to the snapshot taken at time 406. As will be further described in detail below, the drift threshold is a maximum amount of deviation or drift between the current constellation and the snapshot that can be allowed. If the current constellation is within the predetermined drift threshold, the backend computing devices may provide indication at time 420 to the user apparatus that the second factor authentication may be allowed to persist. If the current constellation is outside the drift threshold, the backend computing devices may return a negative persistence check result and the user would be required to reauthenticate via the second factor authentication.

Figure 5:
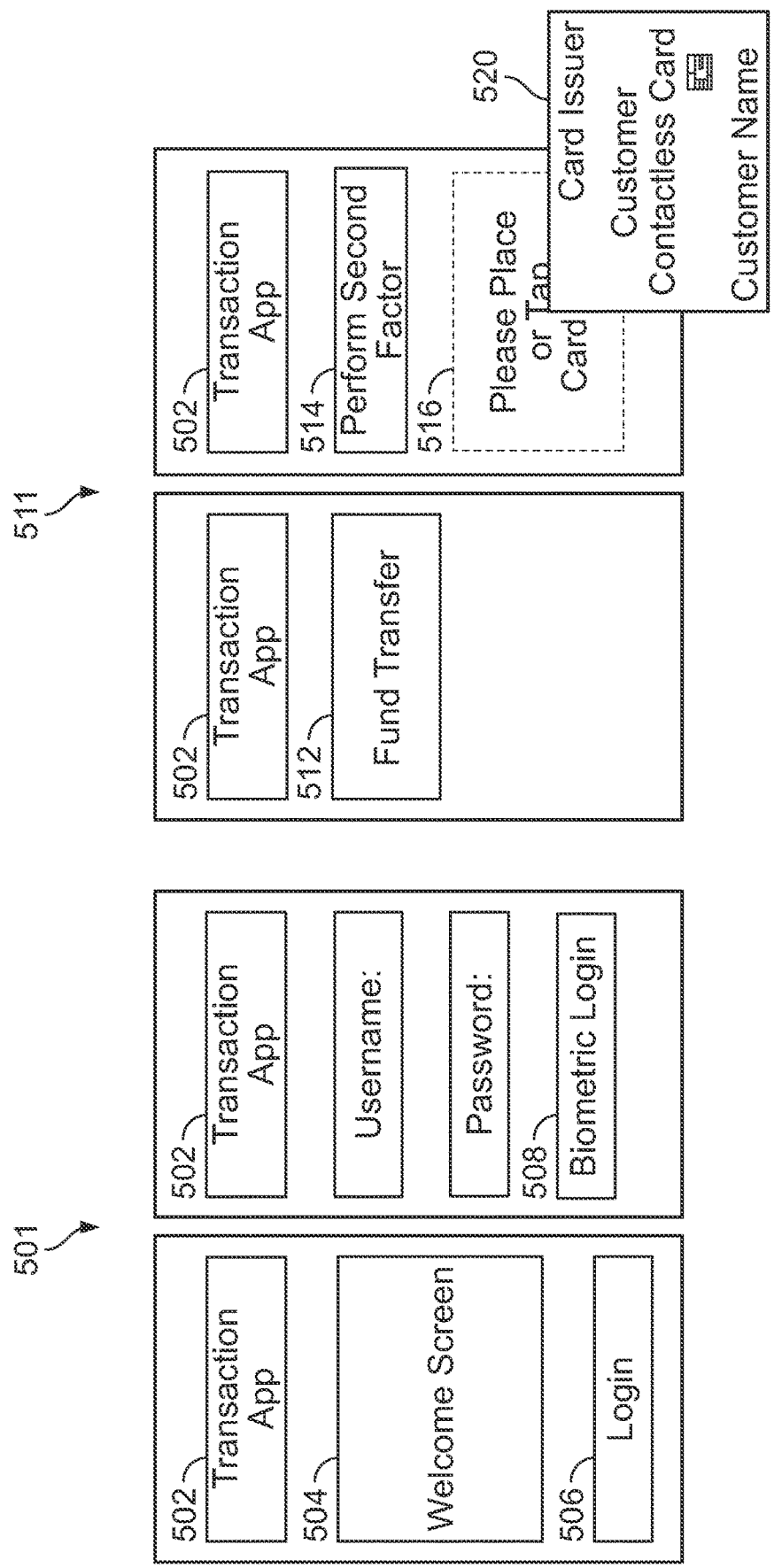
FIG. 5 illustrates example first factor and second factor authentications in accordance with one or more embodiments.

FIG. 5 illustrates example first factor and second factor authentications according to one or more embodiments. As shown, an example of the first factor authentication 501 may involve a user inputting a user ID and password. As further shown, an example of the second factor authentication 511 may involve a user placing or tapping a contactless card to the user apparatus, which may be referred to as single tap or one-tap contactless card authentication.

In examples, a user may be required to authenticate via the first factor authentication to login to a transaction app. The user may open transaction app interface 502, which displays a welcome screen 504 and login icon 506. When the login icon 506 is selected, fields for the user ID and password are presented to the user for user ID and password entry. The interface may also display an icon 508 for logging in to the transaction app via biometric authentication, such as user fingerprint authentication.

When the login ID and password are entered by the user, the user apparatus may send the login information to one or more remote computing devices (e.g., backend authentication servers) that are at least configured to determine and verify that the login ID and password combination is valid and associated with the user. If valid, the user may gain access to the transaction app 502. It may be understood that the first factor authentication may be any type of authentication, such as biometric, passcode, PIN, etc., and not limited to just user ID and password authentication.

Once the user has logged in to the transaction app 502, the user may want to perform a specific transaction, e.g., transfer money to an account. The sum of money being transferred may be large enough to trigger a high-risk indication or warning by the transaction app 502. As described above, this high-risk indication or warning may be considered the authentication event (specifically, in this example, may be considered the second factor authentication event since high-risk fund transfers may require second factor authentication).

As shown, for example, the user may select the fund transfer icon 512 to initiate and perform the transfer. Thereafter, a graphic 514 may display that the user is required to perform single tap or one-tap authentication. The transaction app 502 may display a dashed box 516 indicating where the user should place or tap the user's contactless card 520 to the user apparatus. When the contactless card 520 is brought near the user apparatus to a requisite communication distance, NFC may be established and the NFC reader of the user apparatus may read or receive at least one or more cryptograms from the card 520. The cryptograms may contain various types of encrypted information, such as user authentication information, which may be any indicator or identifier (e.g., unique alphanumeric identifier, code, personally identifiable information, etc.) or the unique customer identifier described above with respect to FIG. 3B that identifies the authorized user of the card.

In embodiments, the user apparatus may receive and send the one or more cryptograms to the one or more remote computing devices, such as backend authentication servers. On the backend server side, the server computers may decrypt the cryptogram(s) and determine whether the user authentication information contained therein actually corresponds to the user. One example of this matching process may involve the backend servers correlating the information of user that has logged into the transaction app to the user authentication information contained in the cryptograms. Thereafter, the backend server computers may send the user apparatus indication of successful authentication. In other instances, it may be understood that one or more cryptograms from the contactless card may be decrypted on the user apparatus side to determine whether the user is an authorized user of the contactless card.

FIG. 6 illustrates an example snapshot 600 of the device settings and user behavioral biometrics at time of second factor authentication according to one or more embodiments. At the time of successful second factor authentication or near such time, a snapshot of a constellation of the device settings of the user apparatus and the user behavioral biometrics. It may be understood that the snapshot 600 may include only the device settings, only the user behavioral biometrics or biometric data, or both the device settings and the behavioral biometrics.

In examples, the one or more device settings may include: (i) one or more applications installed on the apparatus, (ii) one or more wireless devices connected to the apparatus via wireless connection, (iii) a list of saved wireless devices connectable to the apparatus, (iv) a network that the apparatus is connected to, (v) a list of saved networks the apparatus is connectable to, (vi) version of an operating system on the apparatus, (vii) one or more setting preferences, etc.

As shown, sub-constellation 602 indicates that, at the time of successful second factor authentication, the device settings were that there were eight apps installed, three of which were social media apps, three were entertainment apps, one was a food app, and one was a map app. Moreover, there were two wireless devices connected to the user apparatus (e.g., wireless earbuds, smartwatch) and that there were five different types of devices saved to the wireless device connection list. The user apparatus was not connected to Wi-Fi at the time of snapshot, but there were four different types of wireless networks saved to the Wi-Fi network list. Further, the version of the operating system was 2.0 and the display setting was set such that hibernation mode kicks in after three minutes and the notification setting was set at vibration.

In further examples, the one or more user behavioral biometrics or data may be received via one or more sensors (e.g., gyroscope, accelerometer, camera, microphone, etc.) or one or more interfaces of the user apparatus and may be analyzed by the user apparatus. The one or more user behavioral biometrics or biometric data may include: (i) how the user physically holds the apparatus, (ii) how the user swipes or interacts with a display interface, (iii) how the user uses keyboard or gestural shortcuts, (iv) how the user types words, (v) a duration of time for the user to type words, (vi) how the user transitions between two or more icons, (vii) typing speed of user, (viii) typing cadence of user, etc.

As illustrated, sub-constellation 604 indicates that, at the time of successful second factor authentication, various aspects the user's unique behavior or interaction with the user apparatus are that the user rarely holds the user apparatus horizontally, always swipes left to right, has no gestural shortcuts, types approximately 55 words per minute on the user apparatus, the user presses the home button to transition between apps and rarely uses the app tabs to transition, and selects app 606 before app 608 a majority of the time.

It may be understood that user behavioral biometrics broadly refers to identifying an individual based on the unique way(s) the individual interacts or uses with a computing device, such as measuring how the user holds the device, how the individual swipes the screen, which keyboard or gestural shortcuts are used, and building a unique behavioral profile of the individual, etc. The user behavioral biometrics are based on human behavioral patterns consisting of a variety of distinctive actions or behaviors (or semi-behaviors) that make up the individual and may reflect that individual's observable habits and micro-habits.

Figure 7:
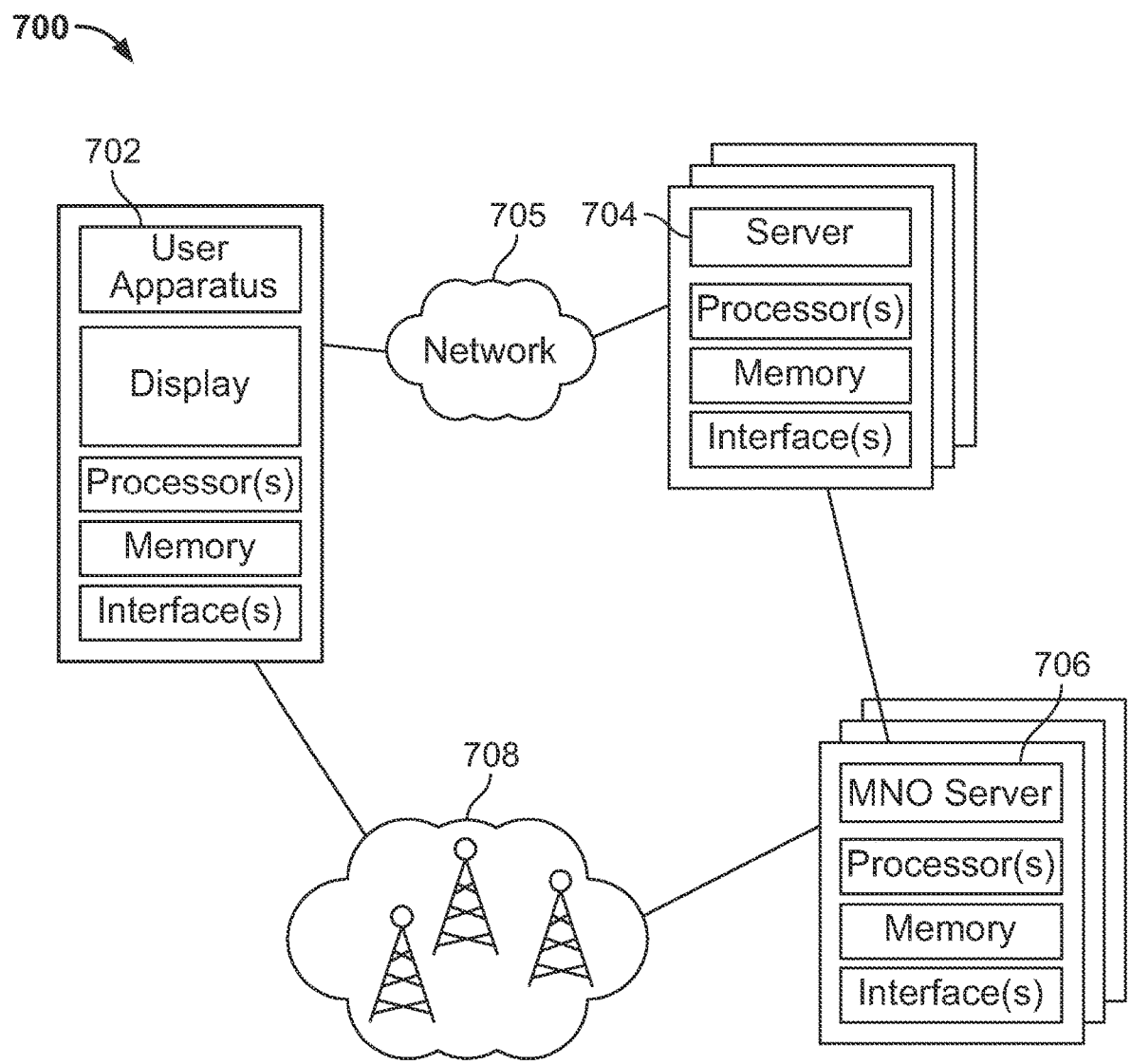
FIG. 7 illustrates an example stability check of a user apparatus in accordance with one or more embodiments.

FIG. 7 illustrates an example stability check 700 of a user apparatus according to one or more embodiments. As described above, the stability check of the user apparatus may be performed to at least confirm that the user associated with the user apparatus has not changed. In examples, the stability check may be a mobile network operator (MNO) verification.

In embodiments, the user apparatus 702 may cause the MNO verification to be initiated. The MNO verification may be initiated or triggered (may otherwise be referred to as a "MNO verification trigger"), for example, when the first instance of the second factor authentication has been performed and (i) when an authentication event occurs or is requested (e.g., high-risk transaction, high amount transfer in the transaction app) or (ii) if a specific amount of time has passed after the first instance of the second factor authentication, e.g., which can be based on or adjusted in accordance with various backend security procedures or protocols.

As shown, the user apparatus 702 may communicate or provide information to the one or more backend servers 704 via network 705 that MNO verification is to be performed based on the above described MNO verification trigger. The backend servers 704 may then establish communication and communicate with one or more MNO computing devices 706, e.g., MNO servers, which may be wirelessly communicating with one or more cell towers 708 or any type of wireless communication devices (e.g., base stations). Because the user apparatus 702 may also be connected to and wireless communicating with the one or more cell towers 708, the MNO computing devices 706 may receive various types of mobile-network-based information about the user apparatus 702 via the cell towers 708, such as what (e.g., model number, identifier) subscriber identity (or identification) module (SIM) card of the user apparatus 702 is being used to communicate with the cell towers 708, whether the SIM card has been changed or replaced, phone number(s) or any other user information associated with the SIM card, whether the phone number(s) or the other user information has changed, etc.

The one or more MNO computing devices 706 may provide these types of information back to the backend servers 704, which may determine based on this information, whether the user apparatus 702 is "stable" and remains unchanged in terms of the MNO-based characteristics. If the SIM card has been changed or replaced, or if the phone number has changed, etc., it is presumed that the user apparatus 702 has changed users, and thus, the backend servers 704 may determine that the user apparatus 702 is unstable. The result of the stability check is then sent to the user apparatus 702 so that the user apparatus can perform device fingerprinting.

It may be understood that the MNO computing devices 706 and cell towers 708 are components external to the system in which the backend servers 704 reside and may be owned or operated by a third-party mobile network operator. A mobile network operator may be understood to be a wireless service provider, carrier, cellular company, mobile network carrier, etc. that provides wireless communications services and may own or control all elements necessary to sell and deliver services to end users including radio spectrum allocation, wireless network infrastructure, back haul infrastructure, etc.

FIG. 8 illustrates an example device fingerprinting according to one or more embodiments. As described above, a user apparatus may receive a request or an indication from one or more backend servers to conduct device fingerprinting. Device fingerprinting involves the user apparatus capturing the current constellation 800 of the device settings of the user apparatus and the user behavior biometrics. It may be understood that device fingerprinting and capturing the current constellation 800 may be similar to the process of taking the snapshot 600 described above with respect to FIG. 6.

As shown, sub-constellation 802 indicates that, at the time of device fingerprinting, the device settings were that there were ten apps installed, three of which were social media apps, three were entertainment apps, one was a food app, one was a map app, one was a TV app, and one was a photo app. Moreover, there was one wireless device connected to the user apparatus (e.g., smartwatch) and that there were six different types of devices saved to the wireless device connection list. The user apparatus was not connected to Wi-Fi at the time of device fingerprinting, but there were five different types of wireless networks saved to the Wi-Fi network list. Further, the version of the operating system was 2.0 and the display setting was set such that hibernation mode kicks in after three minutes and the notification setting was set at silent.

As further shown, sub-constellation 804 indicates that, at the time of device fingerprinting, various aspects the user's unique behavior or interaction with the user apparatus are that the user rarely holds the user apparatus horizontally, always swipes left to right, has no gestural shortcuts, types approximately 50 words per minute on the user apparatus, the user presses the home button to transition between apps and rarely uses the app tabs to transition, selects app 606 before app 608 a majority of the time and similarly selects app 806 before app 808. As described above, the captured constellation 800 of the device fingerprinting may be provided to the one or more backend servers for drift analysis.

FIG. 9 illustrates an example drift analysis 900 according to one or more embodiments. For example, the drift analysis 900 may involve at least (i) comparing the captured result of the current constellation 800 at the time of device fingerprinting and the snapshot 600 taken at the time of the successful second factor authentication and (ii) determining whether the differences between the current constellation 800 and the snapshot 600 are within predetermined drift threshold(s). The predetermined drift threshold limit may be a threshold deviation limit of the one or more device settings and/or the one or more user behavioral biometrics from the time of the second factor authentication to the time the device fingerprinting, e.g., a limit on how much of the device settings and/or user behavioral biometrics can change or deviate within that time span.

According to embodiments, examples of the types of deviations analyzed may include change(s) in the number of apps, change in the types of apps, change in the number of wireless devices connected to the user apparatus, change in the types of wireless devices connected to the user apparatus, change in which network the user apparatus is connected to, change in the saved list of networks that the apparatus can connect to, change in the version of the operating system, change in display settings, change in notification settings, etc.

For example, the predetermined drift threshold may set such that the difference in the number of changed apps cannot exceed three, the difference in the number of changed connected devices cannot exceed three, the difference in the number of changed wireless networks that the user apparatus can connect to cannot exceed three, the version of the operating system cannot change. Other factors may also be analyzed, such as, if the types of the apps that have been added, removed, modified or if the changed display, notification, or other settings are completely or vastly different from snapshot 600 to the current constellation 800, then such differences may exceed and violate the predetermined drift threshold. A similar type of analysis may be applied to the differences in the user behavioral biometrics. For instance, if the types of behavior remain similar or substantially the same, then the changes would fall within the predetermined drift threshold. It may be understood that a machine learning model or neural network may be used to perform the drift analysis, where the machine learning model or neural network may be trained using training data or datasets that contain examples of various drift violations or examples of acceptable drift, etc.

As illustrated, the device setting changes between the snapshot 600 and current constellation 800 are shown in underline in current constellation 800, e.g., the number of apps increased from eight to ten (difference of two), the number of wireless devices connected to the user apparatus decreased from two to one (difference of one), the number of wireless devices saved to the wireless device list increased from five to six (difference of one), the number of saved Wi-Fi networks increased from four to five (difference of one), and the notification setting changed from vibration to silent.

Moreover, the user behavioral changes between snapshot 600 and current constellation 800 are shown in underline, e.g., typing speed decreased from 55 words per minute to 50 words per minute, and that the user selects app 806 before selecting app 808, which is a new behavior metric. The drift analysis 900 may reveal that all device setting changes are within the above-defined drift thresholds. Importantly, the version of the operating system remained the same. The analysis may further reveal that all user behavior changes remain substantially unchanged and that the addition of the new behavior is similar or in line with the behavior previously observed.

Accordingly, based on the drift analysis 900, it may be determined that the changes between the snapshot 600 and the current constellation 800 are within the predetermined drift threshold. Thus, the second factor authentication described above (e.g., the single tap or one-tap authentication) may be allowed to persist for a predetermined duration of time until a subsequent authentication persistence check.

It may be understood that deviations in user behavior may be given more weight than deviations in device settings when determining drift violations. For example, if the user always swipes from the left to right direction (e.g., 99 percent of the time), but now more often swipes right to left, that may indicate that the user may not be the originally authenticated user. In other situations, changes in device settings may be given more weight, e.g., if the apps completely change in type (apps that are majority non-social media change to mostly social media apps). It may further be understood that the predetermined drift threshold may be dependent on at least the risk level of the user action, e.g., higher risk level may warrant more stringent or tighter thresholds, lower risk level may warrant lax or loose thresholds.

Figure 10:
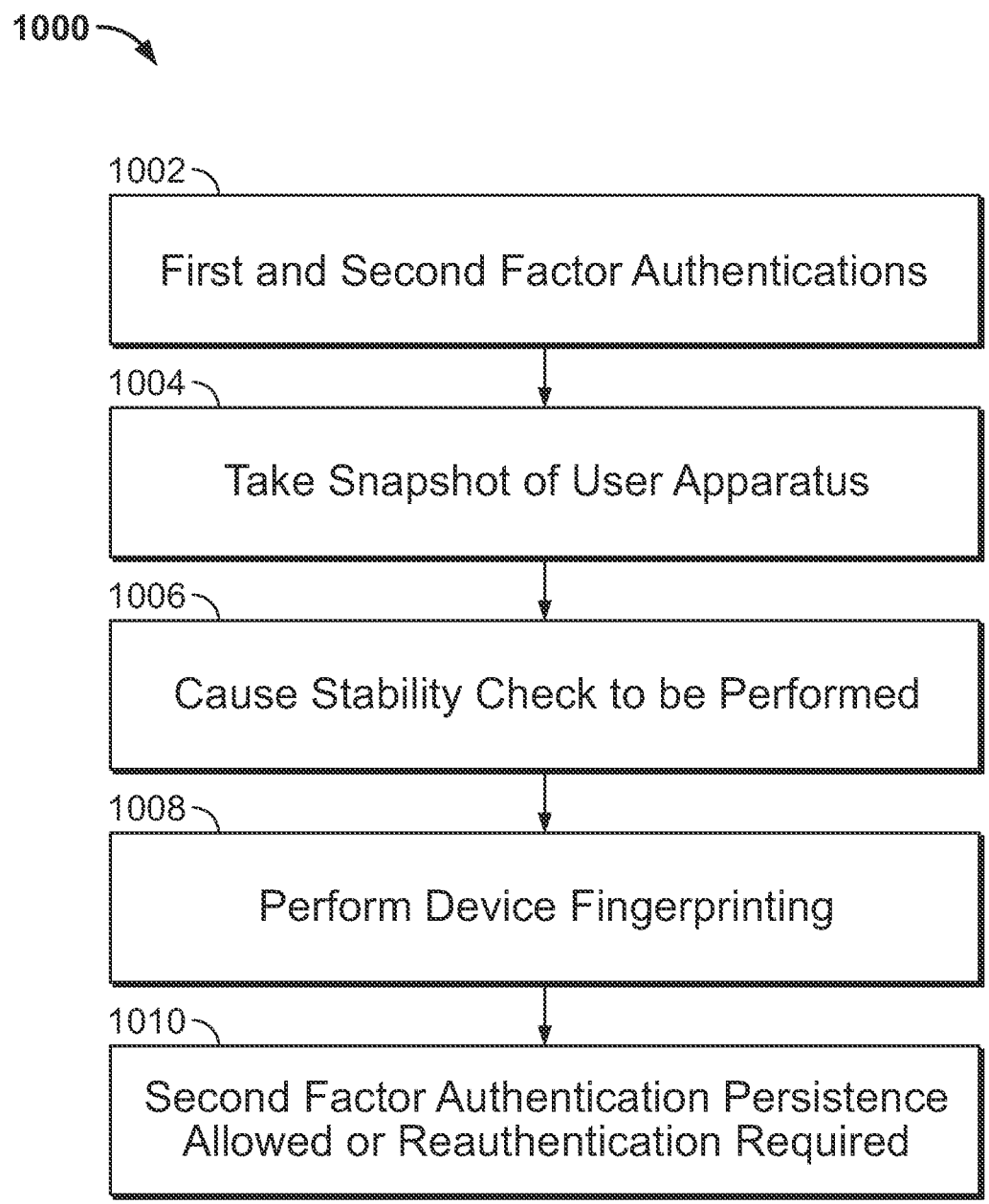
FIG. 10 illustrates an example flow diagram in accordance with one or more embodiments.

FIG. 10 illustrates an example flow diagram 1000 according to one or more embodiments. The flow diagram 1000 is related to at least performing an authentication persistence check and, based on the check, either allowing or disallowing a previously successful authentication to persist. It may be understood that the blocks of the flow diagram 1000 and the features described therein are not required to be performed in any particular order. Moreover, it may be understood that the flow diagram 1000 and the features described therein may be executed by one or more processors or any suitable computing device or computing architecture described herein.

At block 1002, first and second factor authentications may be performed. The first factor authentication may be based on something the user knows, e.g., ID and password input. The second factor authentication may be triggered by a second factor authentication event, such as the transfer of a large amount of money. The second factor authentication may be the single or one tap of the user's contactless smart card, as described above.

At block 1004, a snapshot of the constellation of the device settings of the user apparatus and/or one or more user behavioral biometrics may be taken at the time of successful second factor authentication (or first factor authentication depending on which authentication will persist) at block 1002. The snapshot may be provided to one or more remote backend computing devices (e.g., backend servers associated with a transaction app platform), which may be later used by the backend computing devices as a reference point for determining how much the device settings and behavioral metrics have changed.

At block 1006, a stability check on the user apparatus may be caused to be performed. The check may be caused by the apparatus or may be automatically initiated by the backend computing devices. The stability check may be triggered: when a specific period of time has passed since the first instance of successful authentication or based on the occurrence of an authentication event (e.g., requesting to transfer a large amount of funds via the transaction app). The stability check may be an MNO verification, which involves an MNO providing verification that the user apparatus has not significantly changed, e.g., SIM card has not changed. The result of the MNO verification may be provided to the one or more backend computing devices.

At block 1008, in response to a successful stability check, the backend computing devices may request the user apparatus to perform device fingerprinting. As described above, device fingerprinting may be similar to the snapshot taken at block 1004, except it is done at the time of the device fingerprinting. The result of the device fingerprinting is a current constellation of the device settings of the user apparatus and/or the one or more user behavioral biometrics. The current constellation may be provided to the backend computing devices for drift analysis, as described in detail above.

At block 1010, the user apparatus may receive the result of the drift analysis from the backend computing devices, which indicates that the authentication (e.g., second factor authentication) can or cannot persist. If it can persist, the user is not required to perform the single tap or one tap authentication again and the transfer of the funds can proceed. If it cannot persist, the user is asked to reauthenticate via the single tap or one tape authentication.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus comprising:
a near-field communication (NFC) reader;
one or more processors operable to execute stored instructions that, when executed, cause the one or more processors to:
authenticate a user via first factor authentication;
authenticate the user via second factor authentication different from the first factor authentication, wherein the second factor authentication comprises: a contactless card being tapped to the apparatus such that NFC communication is established, receiving user authentication information from the contactless card via the NFC reader, sending the user authentication information to one or more remote computing devices, and receiving indication from the one or more remote computing devices that the user is authenticated;
determine one or more device settings of the apparatus and one or more user behavioral biometrics at a first time of the second factor authentication;
cause a stability check on the apparatus to be performed: (i) at a second time after the first time or (ii) when a authentication event occurs after the first time;
in response to the apparatus being stable, perform device fingerprinting on the apparatus to determine whether the apparatus is within a predetermined drift threshold;
in response to the apparatus being within the predetermined drift threshold, allow the second factor authentication to persist for a predetermined time period; and
in response to the apparatus not being within the predetermined drift threshold, reauthenticate the user via the second factor authentication.

2. The apparatus of claim 1, wherein the one or more device settings includes: (i) one or more applications installed on the apparatus, (ii) one or more wireless devices connected to the apparatus via wireless connection, (iii) a list of saved wireless devices connectable to the apparatus, (iv) a network that the apparatus is connected to, (v) a list of saved networks the apparatus is connectable to, (vi) version of an operating system on the apparatus, and/or (vii) one or more setting preferences.

3. The apparatus of claim 1, wherein the determination of the one or more user behavioral biometrics comprises the one or more processors to:
receive, via one or more sensors or one or more interfaces, user behavioral data, and
determine based on the user behavioral data: (i) how the user physically holds the apparatus, (ii) how the user swipes or interacts with a display interface, (iii) how the user uses keyboard or gestural shortcuts, (iv) how the user types words, (v) a duration of time for the user to type words, (vi) how the user transitions between two or more icons, (vii) typing speed of user, and/or (viii) typing cadence of user.

4. The apparatus of claim 1, wherein the stability check on the apparatus comprises a mobile network operator (MNO) verification.

5. The apparatus of claim 1, wherein the one or more device settings of the apparatus and the one or more user behavioral biometrics associated with the apparatus are unique to the user at the first time of the second factor authentication,
wherein the device fingerprinting captures a current constellation of the one or more device settings of the apparatus and the one or more user behavioral biometrics associated with the apparatus at a third time of the device fingerprinting, and
wherein the predetermined drift threshold is a threshold deviation limit of the one or more device settings and the one or more user behavioral biometrics from the first time of the second factor authentication to the third time of the device fingerprinting.

6. The apparatus of claim 1, wherein the one or more processors are further caused to, in response to the apparatus not being stable, reauthenticate the user via both the first and second factor authentications.

7. The apparatus of claim 1, wherein the one or more processors are further caused to:
determine a risk level of a user action to be processed or performed; and
process or perform the user action, and
wherein the predetermined drift threshold is at least dependent on the risk level of the user action.

8. A method comprising:
authenticating, via one or more processors, a user based on first factor authentication;
authenticating, via the one or more processors, the user based on second factor authentication different from the first factor authentication, wherein the second factor authentication comprises: a contactless card being tapped to an apparatus such that near field communication (NFC) is established, receiving user authentication information from the contactless card via an NFC reader, sending the user authentication information to one or more remote computing devices, and receiving indication from the one or more remote computing devices that the user is authenticated;
determining, via the one or more processors, one or more device settings of the apparatus and one or more user behavioral biometrics at a first time of the second factor authentication;
causing, via the one or more processors, a stability check on the apparatus to be performed: (i) at a second time after the first time or (ii) when a authentication event occurs after the first time;
performing, via the one or more processors, device fingerprinting on the apparatus to determine whether the apparatus is within a predetermined drift threshold in response to the apparatus being stable;
allowing, via the one or more processors, the second factor authentication to persist for a predetermined time period in response to the apparatus being within the predetermined drift threshold; and
reauthenticating, via the one or more processors, the user based on the second factor authentication in response to the apparatus not being within the predetermined drift threshold.

9. The method of claim 8, wherein the one or more device settings includes: (i) one or more applications installed on the apparatus, (ii) one or more wireless devices connected to the apparatus via wireless connection, (iii) a list of saved wireless devices connectable to the apparatus, (iv) a network that the apparatus is connected to, (v) a list of saved networks the apparatus is connectable to, (vi) version of an operating system on the apparatus, and/or (vii) one or more setting preferences.

10. The method of claim 8, wherein the determining of the one or more user behavioral biometrics further comprises:
receiving, via one or more sensors or one or more interfaces, user behavioral data, and
determining, via the one or more processors, based on the user behavioral data: (i) how the user physically holds the apparatus, (ii) how the user swipes or interacts with a display interface, (iii) how the user uses keyboard or gestural shortcuts, (iv) how the user types words, (v) a duration of time for the user to type words, (vi) how the user transitions between two or more icons, (vii) typing speed of user, and/or (viii) typing cadence of user.

11. The method of claim 8, wherein the stability check on the apparatus comprises a mobile network operator (MNO) verification.

12. The method of claim 8, wherein the one or more device settings of the apparatus and the one or more user behavioral biometrics associated with the apparatus are unique to the user at the first time of the second factor authentication,
wherein the device fingerprinting captures a current constellation of the one or more device settings of the apparatus and the one or more user behavioral biometrics associated with the apparatus at a third time of the device fingerprinting, and
wherein the predetermined drift threshold is a threshold deviation limit of the one or more device settings and the one or more user behavioral biometrics from the first time of the second factor authentication to the third time of the device fingerprinting.

13. The method of claim 8, further comprising reauthenticating, via the one or more processors, the user based on both the first and second factor authentications in response to the apparatus not being stable.

14. The method of claim 8, further comprising:
determining, via the one or more processors, a risk level of a user action to be processed or performed; and processing or performing, via the one or more processors, the user action, and wherein the predetermined drift threshold is at least dependent on the risk level of the user action.

15. At least one non-transitory computer-readable storage medium storing computer-readable program code executable by at least one processor to:

authenticate a user via first factor authentication;

authenticate the user via second factor authentication different from the first factor authentication, wherein the second factor authentication comprises: a contactless card being tapped to an apparatus such that near field communication (NFC) is established, receiving user authentication information from the contactless card via an NFC reader, sending the user authentication information to one or more remote computing devices, and receiving indication from the one or more remote computing devices that the user is authenticated;

determine one or more device settings of the apparatus and one or more user behavioral biometrics at a first time of the second factor authentication;

cause a stability check on the apparatus to be performed: (i) at a second time after the first time or (ii) when a authentication event occurs after the first time;

in response to the apparatus being stable, perform device fingerprinting on the apparatus to determine whether the apparatus is within a predetermined drift threshold;

in response to the apparatus being within the predetermined drift threshold, allow the second factor authentication to persist for a predetermined time period; and in response to the apparatus not being within the predetermined drift threshold, reauthenticate the user via the second factor authentication.

16. The at least one non-transitory computer-readable storage medium of claim 15, wherein the one or more device settings includes: (i) one or more applications installed on the apparatus, (ii) one or more wireless devices connected to the apparatus via wireless connection, (iii) a list of saved wireless devices connectable to the apparatus, (iv) a network that the apparatus is connected to, (v) a list of saved networks the apparatus is connectable to, (vi) version of an operating system on the apparatus, and/or (vii) one or more setting preferences.

17. The at least one non-transitory computer-readable storage medium of claim 15, wherein the determination of the one or more user behavioral biometrics comprises the computer-readable program code to cause the one or more processors to:

receive, via one or more sensors or one or more interfaces, user behavioral data, and determine based on the user behavioral data: (i) how the user physically holds the apparatus, (ii) how the user swipes or interacts with a display interface, (iii) how the user uses keyboard or gestural shortcuts, (iv) how the user types words, (v) a duration of time for the user to type words, (vi) how the user transitions between two or more icons, (vii) typing speed of user, and/or (viii) typing cadence of user.

18. The at least one non-transitory computer-readable storage medium of claim 15, wherein the stability check on the apparatus comprises a mobile network operator (MNO) verification.

19. The at least one non-transitory computer-readable storage medium of claim 15, wherein the one or more device settings of the apparatus and the one or more user behavioral biometrics associated with the apparatus are unique to the user at the first time of the second factor authentication, wherein the device fingerprinting captures a current constellation of the one or more device settings of the apparatus and the one or more user behavioral biometrics associated with the apparatus at a third time of the device fingerprinting, and wherein the predetermined drift threshold is a threshold deviation limit of the one or more device settings and the one or more user behavioral biometrics from the first time of the second factor authentication to the third time of the device fingerprinting.

20. The at least one non-transitory computer-readable storage medium of claim 15, wherein the computer-readable program code causes the one or more processors to, in response to the apparatus not being stable, reauthenticate the user via both the first and second factor authentications.

* * * * *